April 29, 1941.  L. W. WELCH  2,240,473
METHOD OF MAKING HEATER STRUCTURES
Filed July 8, 1940   2 Sheets-Sheet 1
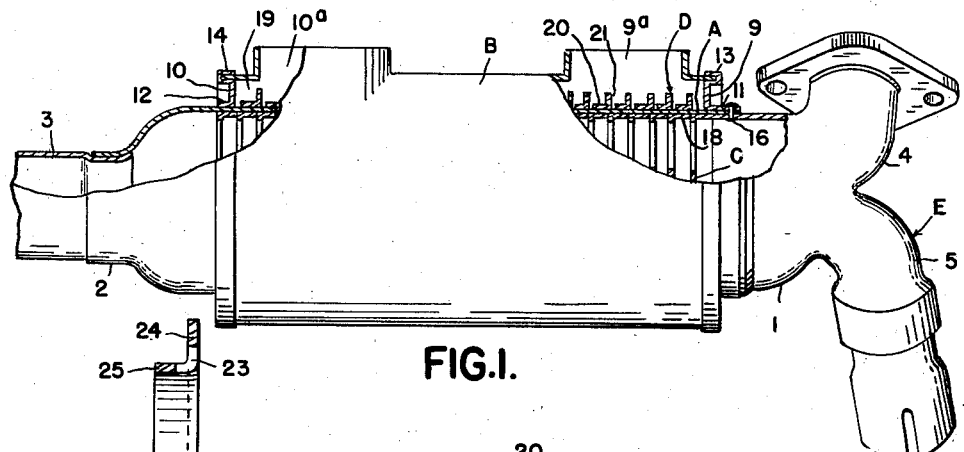
FIG.1.
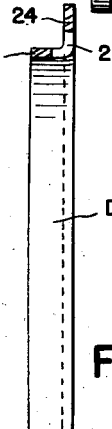
FIG.4.
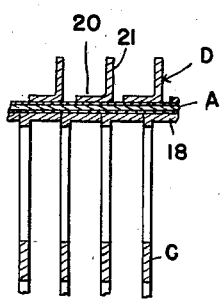
FIG.2.
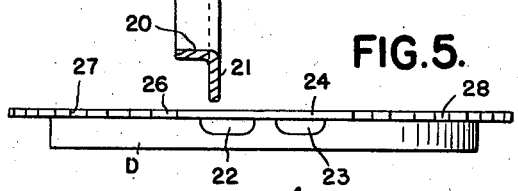
FIG.5.
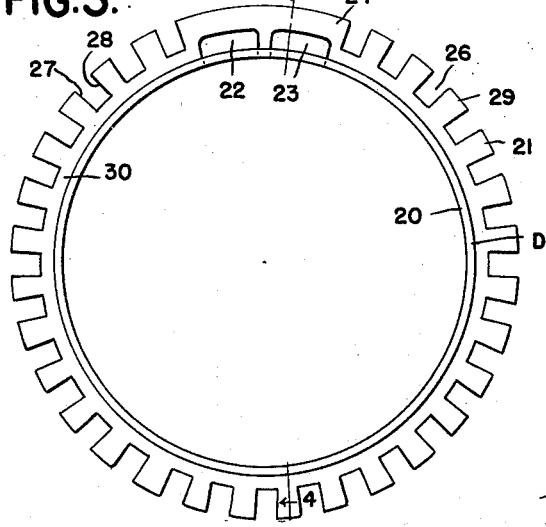
FIG.3.
FIG.7.
INVENTOR.
LEWIS W. WELCH
BY
ATTORNEYS April 29, 1941.     L. W. WELCH     2,240,473
METHOD OF MAKING HEATER STRUCTURES
Filed July 8, 1940     2 Sheets-Sheet 2
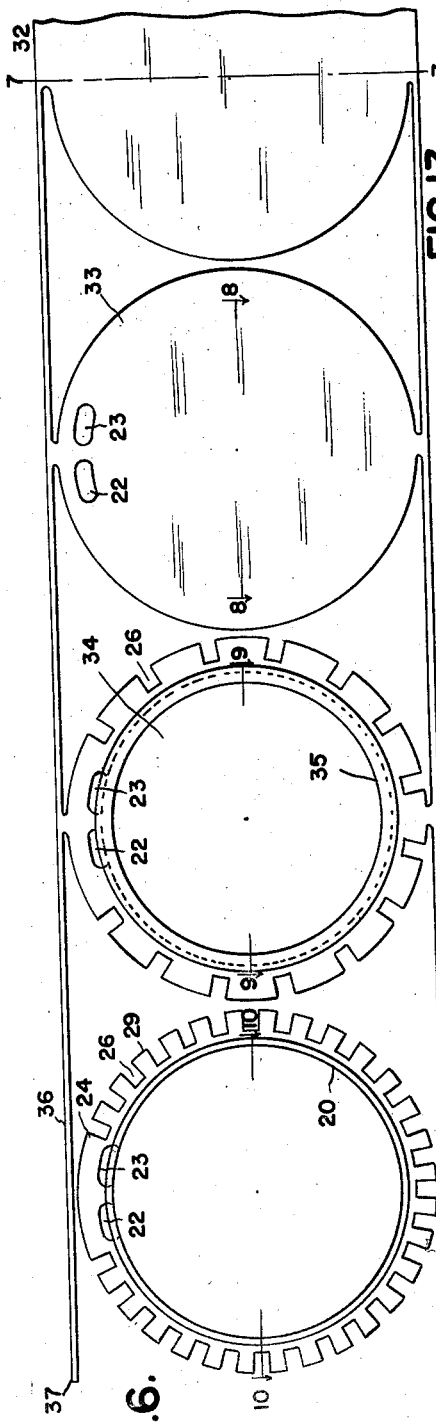
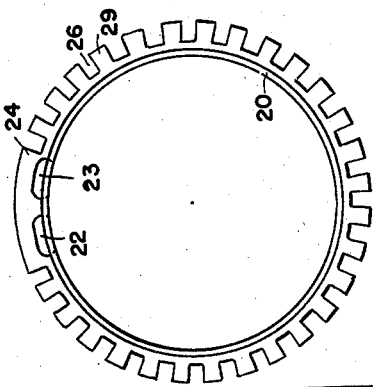
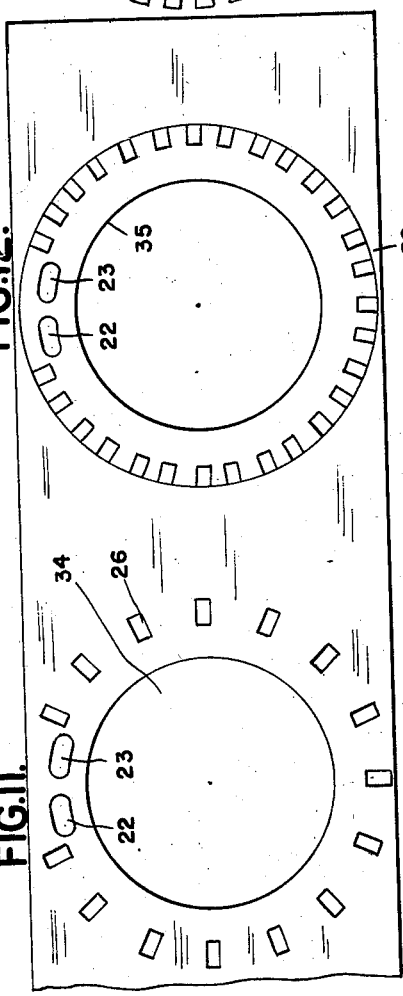
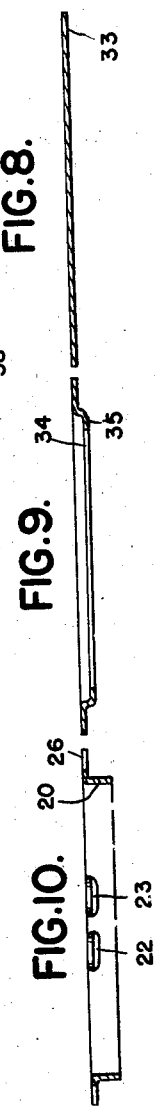
INVENTOR.
LEWIS W. WELCH
BY
ATTORNEYS Patented Apr. 29, 1941

2,240,473

UNITED STATES PATENT OFFICE 2,240,473

METHOD OF MAKING HEATER STRUCTURES

Lewis W. Welch, Detroit, Mich., assignor to Novi Equipment Company, Novi, Mich., a corporation of Michigan Application July 8, 1940, Serial No. 344,425

5 Claims. (Cl. 29—157.3)

This invention relates generally to the manufacture of heat exchange devices such as vehicle heaters in which air from the atmosphere is heated by the exhaust gases from the engine of the vehicle, and constitutes a continuation-in-part of my application filed December 20, 1939, bearing Serial No. 310,242.

One of the essential objects of the invention is to form the elements of the heater in such a way that they may be easily and quickly assembled and readily and effectively united by a hydrogen electric brazing operation.

Another object is to make the heater parts in such a way that they not only facilitate the brazing operation, but also serve more efficiently as heater elements to insure that the maximum amount of heat from the exhaust gases will be absorbed by the air before the latter is discharged through the outlet of the heater to the interior of the vehicle to be heated.

Another object is to assemble and braze the essential parts of the heater in such a way that the copper or other brazing metal used in the brazing operation cooperates with such parts of the heater to prevent leaks.

Another object is to improve the manufacture of such parts whereby a greater number thereof may be made in less time and with less labor, so that the over-all cost of manufacturing the heater structures is materially reduced.

Other objects, advantages and novel details of construction of this invention will be made more apparent as this description proceeds, especially when considered in connection with the accompanying drawings, wherein:

Figure 1 is a side elevation of a heater structure embodying my invention having parts broken away and in section;

Figure 2 is an enlarged fragmentary longitudinal sectional view through the inner shell and adjacent fins;

Figure 3 is a detail elevation of one of the fins;

Figure 4 is a sectional view taken on line 4—4 of Figure 3;

Figure 5 is a top plan view of the fin illustrated in Figure 3;

Figure 6 is a plan view showing the successive operations upon the blank in the manufacture of the fins;

Figure 7 is a sectional view taken on the line 7—7 of Figure 6;

Figure 8 is a sectional view taken on the line 8—8 of Figure 6;

Figure 9 is a sectional view taken on the line 9—9 of Figure 6;

Figure 10 is a sectional view taken on the line 10—10 of Figure 6;

Figures 11, 12 and 13, respectively, are plan views showing a slightly modified method of forming the fins.

Referring now to the drawings, A is the inner shell, B is the outer shell, C are the baffles, and D are the fins of a heater structure embodying my invention.

As shown, the inner shell A is tubular in configuration and is formed from sheet metal. Preferably the forward end thereof is open to receive an annular portion 1 of a header E, while the rear end portion is drawn to provide a reduced neck 2 for an outlet or tail pipe 3.

The header E has two tubular branches 4 and 5, respectively, forming inlets for the exhaust gases from a V-type engine (not shown).

The outer shell B is also tubular in configuration and is substantially concentric with the inner shell A. Preferably this shell B is also formed from sheet metal and is held by annular headers 9 and 10 in proper spaced relation to the inner shell A. Adjacent opposite ends of this outer shell B are openings 9ª and 10ª for air. Any suitable means (not shown) may be employed for conducting air from the atmosphere to the inlet opening 9ª and from the outlet opening 10ª to a suitable air register within the vehicle body. Preferably the headers 9 and 10 are provided at their inner edges with lateral flanges 11 and 12, respectively, sleeved on the inner shell A, and are provided at their outer edges with lateral flanges 13 and 14 of U-cross section that embrace and are secured to the ends of the outer shell B. The lateral flange 11 of the forward header 9 is secured to the inner shell A by a hydrogen electric brazing operation, while the lateral flange 12 of the rear header is free to slide on said inner shell to compensate for contraction and expansion of the outer shell while the heater is in use. Initially the lateral flange 11 of the forward header and the annular portion 1 of the header E are held in fixed relation respectively upon the outer and inner surfaces of the inner shell A by pins 16. The lateral flange 11 and header E are then secured to the inner shell A by a hydrogen electric brazing operation. Thus, any exhaust gases escaping between the annular portion 1 of the header E and the inner shell A will pass harmlessly to the atmosphere outside the header 9.

The disk-like baffles C are spaced apart longitudinally of the inner shell A and have laterally extending attaching flanges 18 arranged in surface-to-surface engagement with and secured by a hydrogen electric brazing operation to the shell. As shown, these baffles C are suitably apertured for the passage therethrough of the exhaust gases and serve effectively to conduct heat from said gases to the walls of the inner shell A.

The fins D are also metal stampings and are sleeved upon the inner shell A. Preferably these fins D are spaced apart longitudinally of the shell and serve to radiate within the air chamber 19 the heat received from the inner shell A. As shown, each fin D is an annulus and is substantially L-shape in cross section. By referring to Figure 4, it will be observed that the horizontal or attaching leg 20 of the L is substantially equal in width to the depth of the upright leg 21. At the juncture of the legs 20 and 21 with each other are two circumferentially spaced elongated openings 22 and 23 which are of sufficient width to extend upwardly into the upright leg 21 and laterally outward into the horizontal leg 20, but are narrow enough to leave solid bridge-like portions 24 and 25 respectively of the legs 21 and 20. Beginning at opposite ends of the portion 24 of the upright leg 21 and located at circumferentially spaced points of the upright leg are substantially rectangular radially extending slots 26 that open outwardly through the outer edges of said leg. Preferably opposite side edges 27 and 28 of each radially extending slot 26 are substantially parallel so that the intermediate solid baffle portions 29 are wider at their outer than at their inner ends. In this connection it will be noted that the inner ends of these slots 26 are spaced slightly outward from the inner edge of each upright leg 21 and thus leave a circumferentially extending solid portion 30 that connects into opposite ends of the solid bridge-like portion 24 of the upright leg.

In the process of construction the inner shell A may be formed from a single sheet of metal by a series of drawing operations in a suitable press so as to be seamless and jointless. Thus, the possibility of exhaust gases which pass through the shell leaking into the air chamber F is reduced to a minimum. Preferably the tail pipe 3 is assembled first with the inner shell A, then the baffles C are inserted into the shell A. Following this, the fins D are assembled upon the shell A. The header 9 is then sleeved upon the shell A, whereupon the annular portion 1 of the header E is inserted into the adjacent end of the shell A. The pins 16 are then inserted in place to initially hold the header 9 and header E in assembled relation to the shell A. The copper used in brazing is then applied.

The baffles C, fins D, headers 9 and 10, and outer shell B are also formed from sheet metal. Any suitable means (not shown) may be used to insert the baffles C into the inner shell so that the flanges 18 will be in surface-to-surface contact therewith. The copper used in the hydrogen electric brazing operation may then be inserted through openings 31 in the baffles so as to lie substantially flat against the flanges 18. Such copper is in wire or strip form but may be in any suitable form for the purposes described. When melted, the copper will seep between the flanges 18 and the inner surface of the shell A.

Preferably the fins D are formed progressively from strip stock by a suitable die (not shown). Initially when the strip stock 32 is fed into the press to what may be termed the first station, the die forms the blank 33 and pierces the two endwise spaced openings 22 and 23 therein. When the strip is advanced further to the second station, the die pierces the central opening 34 and a portion of the slots 26 in the blank and draws the marginal portion 35 of the metal, as illustrated in Figures 6 and 9, respectively. When the strip is advanced still further to the third station, the die pierces the remaining slots 26 in the blank and extrudes the drawn marginal portion 35 into a right angle flange to provide the L-cross section. At this station the scrap metal 36 is preferably cut at 37.

In Figures 11, 12 and 13 I have illustrated a slight modification wherein the first operation is to pierce the two endwise spaced openings 22 and 23, the central opening 34, and a portion of the slots 26. In the second operation the remaining slots 26 are pierced and the circular periphery 38 is formed. In the third operation the marginal portion 35 of the metal is formed into a right angle flange to provide the L-cross section.

When it is desired to assemble the fins D with the inner shell A, the fins are sleeved upon said shell so as to be spaced apart thereon. In this position the horizontal leg 20 of each fin is in surface-to-surface engagement with the shell while the upright leg 21 of each fin extends at substantially right angles to the shell. Preferably the fins D are arranged so that the openings 22 and 23 of the respective fins are in alignment. The copper used in the brazing operation is then inserted through the aligned openings 23 so as to lie flat against the solid bridge portions 25 of the horizontal legs 20 of the fins. Such copper is preferably in wire or strip form but may be any suitable form for the purpose described.

After the parts have been assembled as described, the assembly is then inserted into a suitable furnace where the copper used in brazing is melted. Some of this melted copper will flow through the aligned openings 23 onto the outer surface of the shell A. It will then seep between the inner surface of the horizontal legs 20 and the outer surface of the shell to assist in bonding such parts firmly together. Other portions of the melted copper will flow circumferentially of the horizontal legs 20 to and through the aligned openings 22 onto the outer surface of the shell A. It will then seep between the inner surface of the horizontal legs 20 and the outer surface of the shell to complete the bonding of such parts firmly together.

Thus, with my construction none of the melted copper will be wasted. Any of it that flows circumferentially of the horizontal legs 20 will be trapped by the openings 22. As a result, a proper and complete brazing between the parts will be effected. This is particularly true inasmuch as the horizontal legs 20 of the fins are wide and afford sufficient surface-to-surface area for proper brazing. In fact, the legs 20 of the fins are wide enough to alone adequately support the fins on the shell without having to be in edge-to-edge supporting contact with each other or otherwise brazed. The bridged portions 24 and 25 cooperate with the other solid portions of the fin legs 20 and 21 to insure even and uniform expansion and contraction of the fins during and after the brazing operation, hence a proper union between the fins D and shell A is effected.

In operation, the exhaust gases from the engine will be conducted by the tubular branches 4 and 5 of the header E to the interior of the shell A. Such gases will then flow through the apertures in the baffles C to the outlet or tail pipe 3. The heat from the gases will be conducted by the baffles C to the walls of the shell A and thence via the fins D to the air in the chamber between the shells A and B. The air from the atmosphere will enter this chamber from the inlet 9ª and will be discharged therefrom through the outlet 10ª. While in the air chamber within the heater the air will absorb the heat from the shell A and fins D. In this connection it will be appreciated that such air will be broken up by the baffle portions 29 of the fins and will flow through the slots 26 therein. As a result, the fins provide the maximum scrubbing surface for the air so that the maximum of heat will be absorbed by the air before it is discharged through the outlet 10ª.

What I claim as my invention is:

1. In the manufacture of heat exchange devices, the steps of drawing a tubular shell from one sheet of metal; forming progressively from a second sheet of metal by a suitable die a plurality of annular fins of L-cross section, by initially piercing the second sheet of metal to provide in an arc of a circle two endwise spaced elongated openings, cutting the second sheet on two circular lines respectively spaced substantially equidistantly from the outer and inner elongated sides of and substantially concentric with the longitudinal median line of said endwise spaced openings to provide a substantially annular member, bending each annular member along a circular line coincident or coextensive with the longitudinal median line of the endwise spaced elongated openings and providing an annular fin of L-cross section wherein the spaced openings aforesaid extend circumferentially of the fin at the juncture of the horizontal and upright legs thereof and are spaced from the free edges of said upright and horizontal legs so that solid circumferentially extending bridge-like edge portions of the legs span said openings and cooperate with adjacent solid portions of the fins to insure substantially uniform expansion and contraction of the fins, sleeving the horizontal legs of the fins so formed upon the shell, and brazing the horizontal legs of the fins to the outer surface of the shell.

2. In the manufacture of heat exchange devices, the steps of forming a tubular shell from one sheet of metal; forming progressively from a second sheet of metal a plurality of annular fins of L-cross section, by piercing the second sheet of metal to provide in an arc of a circle two endwise spaced elongated openings, cutting the second sheet on two circular lines respectively spaced substantially equidistantly from the outer and inner elongated sides of and substantially concentric with the longitudinal median line of the endwise spaced openings to provide a substantially annular member, bending each annular member along a circular line coincident or coextensive with the longitudinal median line of the endwise spaced elongated openings to provide an annular fin of L-cross section wherein the spaced openings aforesaid extend circumferentially of the fin at the juncture of the horizontal and upright legs thereof and are spaced from the free edges of said upright and horizontal legs so that solid circumferentially extending bridge-like edge portions of the legs span said openings and cooperate with adjacent solid portions of the fins to insure substantially uniform expansion and contraction of the fins, sleeving the horizontal legs of the fins so formed upon the shell so that the portions of the openings in the upright legs of the respective fins are substantially in alignment, inserting an elongated body of fusible bonding material through one set of aligned portions of the openings, and subjecting the assembly to sufficient heat to melt the bonding material.

3. In the manufacture of heat exchange devices, the steps of forming a tubular shell from one sheet of metal; forming from a second sheet of metal an annular fin of L-cross section, by piercing the second sheet of metal to provide in an arc of a circle two endwise spaced elongated openings, cutting the second sheet on two circular lines respectively spaced substantially equidistantly from the outer and inner sides of and substantially concentric with the longitudinal median line of said endwise spaced openings to provide a substantially annular member, bending the annular member along a circular line coincident or coextensive with the longitudinal median line of the endwise spaced elongated openings to provide an annular fin or L-cross section wherein the spaced openings aforesaid extend circumferentially of the fin at the juncture of the horizontal and upright legs thereof and have portions thereof within but spaced from the free edges of the upright and horizontal legs so that solid circumferentially extending bridge-like edge portions of the legs span said openings and cooperate with adjacent solid portions of the fins to insure substantially uniform expansion and contraction of the fins, sleeving the horizontal leg of the fin so formed upon the shell, and brazing the horizontal leg of the fin to the outer surface of the shell.

4. In the manufacture of heat exchange devices, the steps of forming a tubular shell from one sheet of metal; forming from a second sheet of metal an annular fin of L-cross section, by piercing the second sheet of metal to provide in an arc of a circle two spaced openings, cutting the second sheet on two circular lines respectively spaced substantially equidistantly from the outer and inner sides of the spaced openings to provide a substantially annular member, bending the annular member along a circular line coincident or coextensive with the centers of the spaced openings to provide an annular fin of L-cross section wherein the spaced openings aforesaid are located in the fin at the juncture of the horizontal and upright legs thereof and have portions thereof within and spaced from the free edges of the upright and horizontal legs so that solid circumferentially extending bridge-like edge portions of the legs span the openings and cooperate with adjacent solid portions of the fins to insure substantially uniform expansion and contraction of the fins, sleeving the horizontal leg of the fin so formed upon the shell, and brazing the horizontal leg of the fin to the outer surface of the shell.

5. In the manufacture of heat exchange devices, the steps of forming from a sheet of metal an annular fin of L-cross section, by piercing the sheet of metal to provide in an arc of a circle two spaced openings, cutting the sheet on two circular lines respectively spacd substantially equidistantly from the outer and inner sides of the spaced openings to provide a substantially annular member, bending each annular member along a circular line coincident or coextensive with the centers of the spaced openings to provide an annular fin of L-cross section wherein the spaced openings are located in the fin at the juncture of the horizontal and upright legs thereof and have portions thereof within but spaced from the free edges of the upright and horizontal legs so that solid circumferentially extending bridge-like edge portions of the legs span the openings and cooperate with adjacent solid portions of the fins to insure substantially uniform expansion and contraction of the fins.

LEWIS W. WELCH.